(12) United States Patent
Dake et al.

(10) Patent No.: US 10,694,768 B2
(45) Date of Patent: *Jun. 30, 2020

(54) PROCESS FOR PREPARING A SOLUBLE PROTEIN COMPOSITION

(71) Applicant: INTERNATIONAL DEHYDRATED FOODS, INC., Springfield, MO (US)

(72) Inventors: Roger L. Dake, Springfield, MO (US); Jack C. Cappozzo, Springfield, MO (US); Stephanie Lynch, Springfield, MO (US)

(73) Assignee: INTERNATIONAL DEHYDRATED FOODS, INC., Springfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,761

(22) Filed: Dec. 14, 2018

(65) Prior Publication Data

US 2019/0216109 A1 Jul. 18, 2019

Related U.S. Application Data

(63) Continuation of application No. PCT/US2017/037759, filed on Jun. 15, 2017, and a continuation-in-part of application No. 14/698,332, filed on Apr. 28, 2015, and a continuation-in-part of application No. 14/850,405, filed on Sep. 10, 2015, now Pat. No. 10,349,669.

(60) Provisional application No. 62/350,456, filed on Jun. 15, 2016, provisional application No. 62/461,058, filed on Feb. 20, 2017, provisional application No. 62/461,061, filed on Feb. 20, 2017, provisional application No. 61/985,252, filed on Apr. 28, 2014, provisional application No. 62/048,648, filed on Sep. 10, 2014.

(51) Int. Cl.
| | |
|---|---|
| A23J 1/02 | (2006.01) |
| A23J 3/04 | (2006.01) |
| A23J 1/10 | (2006.01) |
| A23L 33/175 | (2016.01) |
| A23L 5/20 | (2016.01) |
| A23L 27/21 | (2016.01) |

(52) U.S. Cl.
CPC . *A23J 1/02* (2013.01); *A23J 1/10* (2013.01); *A23J 3/04* (2013.01); *A23L 5/20* (2016.08); *A23L 27/21* (2016.08); *A23L 33/175* (2016.08); *A23V 2002/00* (2013.01)

(58) Field of Classification Search
CPC ........ A23J 1/02; A23J 1/10; A23J 3/04; A23L 5/20; A23L 33/175; A23V 2002/00
See application file for complete search history.

(56) References Cited

U.S. PATENT DOCUMENTS

| | | | |
|---|---|---|---|
| 2,963,376 A | 12/1960 | Hogan | |
| 3,796,811 A | 3/1974 | Huth et al. | |
| 3,836,686 A | 9/1974 | Roels | |
| 4,091,003 A | 5/1978 | Bosund | |
| 4,103,038 A | 7/1978 | Roberts | |
| 4,113,884 A | 9/1978 | Krasovec et al. | |
| 4,176,199 A | 11/1979 | Vollmer et al. | |
| 4,220,723 A | 9/1980 | Eckmayer | |
| 4,402,873 A * | 9/1983 | Vollmer | A23J 1/10 426/32 |
| 4,420,425 A | 12/1983 | Lawhon | |
| 4,604,290 A | 8/1986 | Lee et al. | |
| 4,663,048 A | 5/1987 | Tanaka et al. | |
| 5,053,234 A | 10/1991 | Anderson et al. | |
| 5,073,394 A | 12/1991 | Dake et al. | |
| 5,162,129 A | 11/1992 | Anderson | |
| 5,405,632 A | 4/1995 | Mahboob | |
| 5,487,909 A | 1/1996 | Zabel | |
| 5,487,910 A | 1/1996 | Zabel | |
| 5,674,548 A * | 10/1997 | Nakamura | A23C 11/103 426/481 |
| 6,342,252 B1 | 1/2002 | Song | |
| 6,780,841 B2 | 8/2004 | Ishaq | |
| 7,070,953 B1 | 7/2006 | Bjarnason et al. | |
| 10,349,669 B2 * | 7/2019 | Dake | A23L 13/30 |
| 2004/0087504 A1 | 5/2004 | Osajima et al. | |
| 2005/0170060 A1 * | 8/2005 | Raghavan | A23L 27/26 426/589 |
| 2006/0006055 A1 | 1/2006 | Bonde | |
| 2006/0029703 A1 | 2/2006 | Shah et al. | |
| 2006/0040027 A1 | 2/2006 | Shah et al. | |

(Continued)

FOREIGN PATENT DOCUMENTS

| | | | |
|---|---|---|---|
| CN | 1336333 | * | 2/2002 |
| CN | 101481649 | * | 7/2009 |

(Continued)

OTHER PUBLICATIONS

"Broth". American Heritage Dictionary. 5th Edition. 2011. https://www.yourdictionary.com/broth.*
English Translation for CN102206684 published Oct. 2011.*
English Translation for KR20040038305 published May 2004.*
English Translation for CN102657320 published Sep. 2012.*
English Translation for CN1336333 published Feb. 2002.*
English Translation for CN101481649 published Jul. 2009.*
English Translation for CN102113686 published Jul. 2011.*
International Search Report and Written Opinion of PCT/US2015/027986 dated Jul. 27, 2015, 18 pages.

(Continued)

*Primary Examiner* — Anthony J Weier
(74) *Attorney, Agent, or Firm* — Lathrop GPM LLP

(57) ABSTRACT

This application provides a high quality protein composition and the processes of making the same. The compositions prepared by filtration according to the instant application may contain higher percentage of branched chain amino acids (BCAA) and/or essential amino acids (EAA). The compositions may have reduced level of sodium and also lighter color than that of the composition before passing through the filtration means.

20 Claims, No Drawings

(56) References Cited

U.S. PATENT DOCUMENTS

| | | |
|---|---|---|
| 2006/0045951 A1 | 3/2006 | Shah et al. |
| 2006/0069244 A1 | 3/2006 | Holtzapple |
| 2006/0088634 A1 | 4/2006 | Shah et al. |
| 2006/0172058 A1 | 8/2006 | Achs |
| 2006/0286269 A1 | 12/2006 | Shah et al. |
| 2007/0077333 A1 | 4/2007 | Maeda et al. |
| 2009/0238930 A1 | 9/2009 | Sathivel |
| 2010/0028525 A1 | 2/2010 | Lucey et al. |
| 2011/0033889 A1 | 2/2011 | Soerensen et al. |
| 2011/0183060 A1 | 7/2011 | Kuramoto et al. |
| 2011/0250316 A1 | 10/2011 | Scheide-Fischer et al. |
| 2012/0171345 A1 | 7/2012 | Kelleher et al. |
| 2012/0171352 A1 | 7/2012 | Kelleher et al. |
| 2012/0252065 A1 | 10/2012 | Rozenszain et al. |
| 2012/0258236 A1 | 10/2012 | Cruz Serna |
| 2012/0271032 A1* | 10/2012 | Hirschman ............ C07K 19/00 530/322 |
| 2014/0271991 A1 | 9/2014 | Dake et al. |
| 2015/0305368 A1* | 10/2015 | Dake .................. A23J 1/02 426/7 |
| 2015/0305369 A1 | 10/2015 | Dake et al. |
| 2015/0305389 A1 | 10/2015 | Dake et al. |
| 2016/0066611 A1 | 3/2016 | Dake et al. |
| 2019/0116832 A1* | 4/2019 | Dake .................. A23J 1/02 |

FOREIGN PATENT DOCUMENTS

| | | | |
|---|---|---|---|
| CN | 102113686 | * | 7/2011 |
| CN | 102206684 | * | 10/2011 |
| CN | 102657320 | * | 9/2012 |
| EP | 0180281 A2 | | 5/1986 |
| EP | 1665939 | | 6/2006 |
| EP | 2484226 A1 | | 8/2012 |
| FR | 2218060 A1 | | 9/1974 |
| JP | 2002045154 A | | 2/2002 |
| JP | 2007166989 A | | 7/2007 |
| KR | 20040038305 | * | 5/2004 |
| WO | WO 1988/05633 | | 8/1988 |
| WO | WO 1994/01003 A1 | | 1/1994 |
| WO | WO 1996/08974 | | 3/1996 |
| WO | WO 2002/087354 | | 11/2002 |
| WO | WO 2004/021797 | | 3/2004 |
| WO | WO 2004/073415 A2 | | 9/2004 |
| WO | WO 2013/108986 | | 7/2013 |

OTHER PUBLICATIONS

International Search Report and Written Opinion of PCT/US2017/037759 dated Sep. 21, 2017, 9 pp.

International Preliminary Report on Patentability of PCT/US2017/037759 dated Dec. 18, 2018, 8 pp.

International Search Report and Written Opinion of PCT/US2015/049406 dated Nov. 30, 2015, 20 pp.

Extended European Search Report of EP 15785640 dated Sep. 19, 2017, 16 pp.

European Patent Application No. 15840487.1, Extended European Search Report and Opinion dated Jun. 20, 2018, 11 pgs.

U.S. Appl. No. 14/698,332, Non-Final Office Action dated Jun. 27, 2019, 25 pp.

U.S. Appl. No. 14/698,332, Non-Final Office Action dated Mar. 5, 2019, 19 pp.

European Patent Application No. 17814129.7; Extended European Search Report and Opinion dated Feb. 27, 2020; 9 pgs.

Nazir Akmal et al. (2019), "Membrane separation technology for the recovery of nutraceuticals from food industrial streams", Trends in Food Science and Technology, vol. 86, Feb. 13, 2019, pp. 426-438.

* cited by examiner

PROCESS FOR PREPARING A SOLUBLE PROTEIN COMPOSITION

RELATED APPLICATIONS

This application is a continuation of International Application No. PCT/US2017/037759 filed Jun. 15, 2017, which claims the benefit of priority to U.S. Patent Application No. 62/350,456 filed Jun. 15, 2016, U.S. Patent Application No. 62/461,058 filed Feb. 20, 2017, and U.S. Patent Application No. 62/461,061 filed Feb. 20, 2017. This application is also a continuation of U.S. patent application Ser. No. 14/698,332 filed Apr. 28, 2015, which claims the benefit of priority to U.S. Provisional Application No. 61/985,252 filed Apr. 28, 2014, This application is also a continuation of U.S. patent application Ser. No. 14/850,405 filed Sep. 10, 2015, which claims the benefit of priority to U.S. Provisional Application No. 62/048,648 filed Sep. 10, 2014. The entire content of all of the above-mentioned applications is hereby incorporated by reference into this application.

BACKGROUND

1. Field of the Invention

This disclosure relates to a process for making a broth composition. More particularly, the disclosure relates to methods for preparing compositions from poultry or other meat sources that contain higher levels of certain desirable amino acids.

2. Description of Related Art

Broth prepared from animal (including poultry) or plant sources has high nutrition values and may be used as ingredients in preparing many food products and beverages. However, protein quality varies among different protein products. Most existing protein preparations lack in protein quality and uniformity. Many existing protein preparations do not have high proportions of essential or indispensable amino acids or do not have high concentration of specific desirable nutrients.

SUMMARY

The instrumentalities disclosed herein provide methods for making broth compositions containing higher levels of certain amino acids, or other compounds. In another aspect, the disclosure provides methods for preparing a high quality soluble protein composition. In another aspect, the disclosure also provides methods for making broth compositions containing reduced levels of certain ingredients, such as, by way of example, sodium.

In one embodiment, the compositions may be prepared from an animal or plant source. Examples of animal sources may include but are not limited to meat or other body parts of birds, cattle, pigs, among others. Examples of birds may include but are not limited to chickens or turkeys.

In one embodiment, fractions or extracts of animal or plant proteins are passed through a filtration means to separate the flow into permeate or retentate with higher amounts of essential (EAA)/indispensable amino acids (IAA) in either the permeate or the retentate.

In another embodiment, the filtration means may include but are not limited to microfiltration, or ultrafiltration membranes. In one aspect, this filtration step may result in protein fractions enriched in certain essential amino acids. In another aspect, this filtration step may result in protein fractions having certain amino acids or other compounds at a concentration higher than their naturally occurring proportions. In another aspect, this filtration means may specifically retain components such as collagen protein, or peptides such as taurine, anserine, carnosine, creatine/creatinine, L-carnitine, choline. In another aspect, the filtration means may specifically retain BCAA or EAA. In another aspect, this filtration means of this disclosure may specifically allows sodium to pass through. In another aspect, the filtration means may have pore size between 100 nanometer (nm) and 500 nm, between 100 nm and 200 nm, between 10 nm and 50 nm, or between 50 nm and 100 nm.

In one embodiment, the amino acids or compounds that are enriched may include but are not limited to collagen protein, peptides such as taurine, anserine, carnosine, creatine/creatinine, L-carnitine, choline, and many other specific nutrients of value.

In one embodiment, one or more enzymes may be used in the process of making the initial composition to be applied to the filtration means, e.g., the soluble protein composition. In another embodiment, a pressure cooking step may be employed in the disclosed process. It has been unexpectedly discovered that the disclosed process produces higher quality proteins by improving the amino acid composition and ratio extracted from normal raw materials. In one embodiment, the soluble protein composition may contain more than 70%, 80%, 85%, or 90% (w/w) of protein but less than 5%, 3%, 2%, 1%, or 0.5% (w/w) of fat. In another embodiment, more than 70%, 80%, 90%, 95% or 99% (w/w) of the proteins in the composition is soluble in water. In another embodiment, more than 70%, 80%, 90%, 95% or 99% (w/w) of the proteins in the composition is soluble in water at room temperature and under normal pressure. In another embodiment, more than 70%, 80%, 90%, 95% or 99% (w/w) of the proteins in the composition is soluble in water after being heated to a temperature of at least 180 F, or 200 F.

In one embodiment, the instant disclosure provides a soluble protein composition from an animal or plant source. In another embodiment, the soluble protein composition may be used in a final product with or without dilution, as a concentrate, or in a dry form.

In another embodiment, the product of this disclosure provides a high quality, complete animal protein powder from poultry (or other sources) that is completely soluble. Soluble protein is valuable for applications in beverages and other foods where particulates are not desired. Soluble protein is also advantageous in preparation of special foods that must be administered through tube feeding.

In another embodiment, the percentage of tryptophan by weight of total amino acids in the disclosed soluble protein composition is greater than 0.6%, 0.7%, or 0.8%. In another embodiment, the percentage of hydroxyproline by weight of total amino acids in the disclosed soluble protein composition is less than 2% or less than 3%.

In another embodiment, the disclosed process may include (a) applying a starting material to a filtration means, (b) allowing the starting composition to pass through the filtration means, and (c) collecting the retentate to obtain the desired composition. In one aspect, the composition collected in step (c) may be enriched in certain amino acids or other compounds. In another aspect, the composition collected in step (c) may be low in sodium.

In another embodiment, the amount of branched chain amino acids (BCAA) in the composition obtained in step (c) is at least 20%, 30%, 40%, or 50% higher than the amount of BCAA in the composition in the starting material. In another embodiment, BCAA constitute more than 6%, 8%, 10%, or 12% (w/w) of total amino acids in the composition obtained in step (c) above.

In another embodiment, the amount of essential amino acids (EAA) in the composition obtained in step (c) above is at least 20% higher than the amount of EAA in the composition in the starting material. In one aspect, EAA may constitute more than 25%, 30%, 33%, or 35% (w/w) of total amino acids in the composition obtained in step (c) above.

In another embodiment, the level of sodium in the composition obtained in step (c) above is at least 30%, 50%, 80%, or 100% lower than the level of sodium in the starting material. For purpose of this disclosure, when the level of a substance in composition A is 100% lower than that in composition B, it means that the level of the substance in composition A is 50% of the level of the substance in composition B. In one aspect, sodium may constitute less than 1.5%, 1% or less than 0.5% (w/w) based on total solids in the composition obtained in step (c).

In one embodiment, the color of the composition obtained in step (c) is different from the color of the starting material. For example, the color of the composition obtained in step (c) may be significantly lighter than the color of the starting material. In one aspect, the difference in color may be determined by human eyes and two colors are significantly different if the color difference can be readily distinguished by human eyes. In another aspect, the difference in color may be determined by an instrument.

In another embodiment, examples of filtration means may include but are not limited to microfiltration, ultrafiltration, nanofiltration, reverse osmosis, membrane and combination thereof.

In one embodiment, a method of preparing a broth composition by cooking a previously cooked broth is disclosed. This method may include the following steps: (a) incubating a first mixture at an elevated temperature of at least 40 C, for example, between 50-120 C for a period of time of at least 5 minutes, for example, between 10 minutes and 96 hours; (b) separating the liquid fraction from the solid fraction of the first mixture after step (a); and (c) collecting the liquid fraction of step (b). The first mixture may contain a liquid fraction and a solid fraction. In one aspect, at least the solid fraction of the first mixture has been cooked prior to step (a).

The composition collected in step (c) may also be referred to as a "second-cooked broth." In one aspect, the entire first mixture may be referred to as a "first-cooked broth." In another aspect, the solid and liquid fractions of the first-cooked broth have been separated prior to step (a) and fresh liquid fraction is added to the solid fraction of the first-cooked broth prior to step (a). In another aspect, the first-cooked broth or the solid fraction of the first-cooked broth has been refrigerated prior to step (a).

In one embodiment, the incubation of step (a) may take place under pressure. By way of the example, the pressure may be between 0.1 psig to 50 psig, or between 1 psig to 20 psig.

In another embodiment, the amount of branched chain amino acids (BCAA) in the composition obtained in step (c) is at least 20% higher than the amount of BCAA in the first mixture prior to the incubation in step (a).

In another embodiment, the disclosed process may further include a step (d) of applying the liquid fraction collected in step (c) to a filtration means and a step (e) of collecting retentate or permeate after the filtration step (e).

In another embodiment, a method of preparing a broth composition directly from raw materials is disclosed. The method may include steps of cooking raw meat/bone or other animal parts more than once. This method may include the following steps: (a) mixing animal parts with water or an aqueous solution to form a mixture, (b) incubating the mixture of step (a) at an elevated temperature of at least 40 C, for example, between 50-120 C, for a period of time of at least 5 minutes, for example, between 10 minutes and 96 hours, (c) removing liquid fraction from solid fraction after step (b), (d) incubating the solid fraction obtained from step (c) with water or an aqueous solution at an elevated temperature of at least 40 C, for example, between 50-120 C, for a period of time of at least 5 minutes, for example, between 10 minutes and 96 hours, e) removing solid fraction from liquid fraction after step (d), and (f) collecting the liquid fraction from step (e). In another embodiment, this method may further include step (g) applying the liquid fraction collected in step (f) to a filtration means, and step (h) collecting retentate or permeate. The filtration means may have a pore size of 200 nm, 100 nm, 50 nm or smaller.

In one embodiment, the starting material may be any broth (extracts) prepared from an animal or plant source. In another embodiment, the starting material may be prepared from raw animal parts, for example, meat, cartilage, or bones. Animal source may include but is not limited to chicken, turkey, beef, pork or other animal or poultry sources.

In another embodiment, the starting material may be prepared from raw mechanically separated poultry (MSP), mechanically separated chicken (MSC), or finely ground poultry pieces (such as poultry trims or ground poultry parts) with water at room temperature or lower. By way of example, the first extraction (i.e., first cook) may be conducted by adding water into raw MSC. The mixture can then be stirred to facilitate mixing and extracting. The ratio between the MSC and water in the extraction mixture may range from about 4:1 to about 1:20 by weight, from about 1:1 to about 1:4 by weight, or about 1:2 by weight. In another embodiment, the MSC and water mixture may be subject to centrifugation at the end of the extraction. The starting material may be prepared on-site and may be used for making the present composition right after it is made fresh on-site. Alternatively, the starting material may be from packaged products or may be collected off-site.

In another embodiment, the starting material may be in a substantially liquid form which contains significant amount of poultry sarcoplasm. The term "substantially liquid form" means that the starting material is mostly liquid but may contain minor amount of insoluble material. For instance, the starting material may be in the form of a raw liquid collected from a poultry processing plant or from a poultry storage container or package. In another embodiment, the starting material may be liquid that typically exudes from cut and exposed muscle or bone tissues. This liquid is also known as muscle serum or myogen.

In another embodiment, the starting material may appear reddish because it may contain the natural myoglobin, and/or intracellular liquid, sarcoplasm, and/or sarcoplasmic reticulum with its proteins, minerals, and metabolites.

In another embodiment, the disclosed composition thus obtained may be used in many food products. Examples of such products may include but are not limited to snacks, comfort food, pastry, protein drink, smoothies, sports drink or nutritional beverages, among others.

DETAILED DESCRIPTION

This disclosure relates to a process for making a high protein composition from an animal source or plant source.

In one aspect, the disclosed process may be used to make a broth composition high in branched chain amino acids (BCAA) and low in sodium. In another aspect, the product may be passed through a filtration separation step using microfiltration, ultrafiltration, and or nanofiltration to enrich certain compounds in one fraction while reducing these and/or other compounds in another fraction. In another aspect, reverse osmosis may be employed to concentrate the composition.

In one embodiment, the composition may be prepared by cooking a previously cooked composition before being subject to the filtration separation step. In one aspect, it is disclosed that the levels of branched chain amino acids (BCAA) are higher from a second extractive cooking.

In one embodiment, the disclosure provides methods of making a high quality protein composition from poultry. Chicken broth is widely used in many traditional foods such as soups, stews, chowders, gravies, and sauces. As compared to other broth products, the disclosed compositions are easier to handle and provide a better balance of proteins and amino acids than regular broth prepared according to conventional methods.

In one aspect, the disclosed process may be used to turn lower value raw poultry materials into a high value protein powder or broth without using additives.

In one embodiment, the compositions may be used as an ingredient in traditional food products, snack, or beverage products. In another embodiment, the disclosed composition may also be used to prepare protein drinks, smoothies, or other nutritional or sport beverages.

It is to be noted that, as used in this specification and the claims, the singular forms "a," "an," and "the" include plural referents unless the context clearly dictates otherwise. Thus, for example, reference to "a device" may include reference to one device, as well as two or more devices, unless the context clearly limits the reference to one device.

The terms "between" and "at least" as used herein are inclusive. For example, a range of "between 5 and 10" means any amount equal to or greater than 5 but equal to or smaller than 10.

Unless otherwise specified, the percentage of certain component in a composition is by weight of total solid. Various commercially available products may have been described or used in this disclosure. It is to be recognized that these products are cited for purpose of illustration only. Certain physical and/or chemical properties and composition of the products may be modified without departing from the spirit of the present disclosure. One of ordinary skill in the art may appreciate that under certain circumstances, it may be more desirable or more convenient to alter the physical and/or chemical characteristics or composition of one or more of these products in order to achieve the same or similar objectives as taught by this disclosure.

By way of example, several embodiments of the disclosed processes are described below:

1. In one embodiment, a method of making a composition is disclosed, comprising:
   (a) applying a starting material to a filtration means, said filtration means having a pore size of 100 nm or smaller, for example, between 10 nm and 100 nm, or between 50 nm and 100 nm, or between 10 nm and 50 nm,
   (b) allowing the starting material to pass through the filtration means, and
   (c) collecting the retentate to obtain said composition.
2. In another embodiment, methods according to Item 1 are disclosed, wherein the amount of branched chain amino acids (BCAA) in the composition obtained in step (c) is at least 20% higher than the amount of BCAA in the composition in the starting material.
3. In another embodiment, methods according to any one of the preceding items are disclosed, wherein BCAA constitute more than 10% (w/w) of total amino acids in said composition obtained in step (c).
4. In another embodiment, methods according to any one of the preceding items are disclosed, wherein the amount of essential amino acids (EAA) in the composition obtained in step (c) is at least 20% higher than the amount of EAA in the composition in the starting material.
5. In another embodiment, methods according to any one of the preceding items are disclosed, wherein EAA constitute more than 33% (w/w) of total amino acids in said composition obtained in step (c).
6. In another embodiment, methods according to any one of the preceding items are disclosed, wherein the level of sodium in the composition obtained in step (c) is at least 50% lower than the level of sodium in the starting material.
7. In another embodiment, methods according to any one of the preceding items are disclosed, wherein sodium constitutes less than 1% (w/w) based on total solids in said composition obtained in step (c).
8. In another embodiment, methods according to any one of the preceding items are disclosed, wherein said filtration means is selected from the group consisting of microfiltration, ultrafiltration, nanofiltration, reverse osmosis, membrane and combination thereof.
9. In another embodiment, methods according to any one of the preceding items are disclosed, wherein said starting material is prepared from an animal source.
10. In another embodiment, methods according to any one of the preceding items are disclosed, wherein said starting material is prepared from poultry.
11. In another embodiment, methods according to any one of the preceding items are disclosed, wherein the color of the composition obtained in step (c) is different from the color of the starting material.
12. In another embodiment, methods according to any one of the preceding items are disclosed, wherein the color of the composition obtained in step (c) is substantially lighter than the color of the starting material. In one aspect, the color of the different compositions may be measured by eyes. In another aspect, the color of the different compositions may be measured by spectrophotometry.
13. In one embodiment, methods for preparing a composition are disclosed, comprising:
   (a) incubating a first mixture at a temperature of 40 C or higher for a time period of at least 5 minutes, said first mixture comprising a liquid fraction and a solid fraction, wherein at least said solid fraction has been cooked prior to step (a),
   (b) separating the liquid fraction from the solid fraction of the first mixture after step (a), and
   (c) collecting the liquid fraction of step (b).
14. In another embodiment, methods according to item 13 are disclosed, wherein the solid fraction of the first mixture has been refrigerated prior to step (a).
15. In another embodiment, methods according to items 13-14 are disclosed, wherein the first mixture is prepared from poultry.
16. In another embodiment, methods according to items 13-15 are disclosed, wherein the incubation of step (a) takes place under pressure between 1 psig to 20 psig.
17. In another embodiment, methods according to items 13-16 are disclosed, wherein the incubation of step (a) takes place at a temperature between 50-125 C.
18. In another embodiment, methods according to items 13-17 are disclosed, wherein the time period in step (a) is between 10 minutes and 96 hours.

19. In another embodiment, methods according to items 13-18 are disclosed, wherein the amount of branched chain amino acids (BCAA) in the composition obtained in step (c) is at least 20% higher than the amount of BCAA in the first mixture prior to step (a).

20. In another embodiment, methods according to items 13-19 are disclosed, further comprising step (d) applying the liquid fraction collected in step (c) to a filtration means and step (e) collecting retentate or permeate, said filtration means having pore size of 100 nm or smaller.

21. In one embodiment, methods for preparing a composition are disclosed, comprising:
  (a) mixing animal parts with water or an aqueous solution to form a mixture,
  (b) incubating the mixture of step (a) at a temperature of 40 C or higher for a time period of at least 5 minutes,
  (c) removing liquid fraction from solid fraction after step (b),
  (d) incubating the solid fraction obtained from step (c) with water or an aqueous solution at a temperature of 40 C or higher for a time period of at least 5 minutes,
  (e) removing solid fraction from liquid fraction after step (d), and
  (f) collecting the liquid fraction from step (e).

22. In another embodiment, methods according to item 21 are disclosed, further comprising step (g) applying the liquid fraction collected in step (f) to a filtration means, and step (h) collecting retentate or permeate, said filtration means having a pore size of 100 nm or smaller.

23. In another embodiment, compositions prepared according to the methods described in any of the preceding items are disclosed, wherein the compositions have enriched branched chain amino acids (BCAA) and/or enriched essential amino acids (EAA), and/or lower level of sodium.

EXAMPLES

The following examples are provided to illustrate the present invention, but are not intended to be limiting. The reagents, materials and instruments are presented as typical components, and various substitutions or modifications may be made in view of the foregoing disclosure by one of skills in the art without departing from the principle and spirit of the present invention.

Example 1 Preparation of a Broth Composition by Cooking Twice

Mechanically separated chicken was cooked in 5-10% water (v/v) in an open vessel at about 185 F for about 10-15 minutes to obtain cooked meat pieces simmering in brothy liquid. The resulting liquid was separated from solid by gravity separation and screening. The resulting broth (or liquid, also called "first cook broth") was tested for amino acid profile and mineral content.

The fully cooked meat after liquid removal was added to two parts water and thoroughly mixed. It was cooked at 15 psig pressure at 121° C. for 6 hours, and allowed to cool overnight.

The resulting broth was separated from the meat by screening. This broth (called "second cook broth") was tested for amino acid profile and sodium content. The second cook broth had significantly higher BCAA content at 11% (calculated based on 100% solid basis), as compared to BCAA content of 5% (calculated based on 100% solid basis) for the first cook broth (Table 1).

The second cook broth was passed through a 0.2 micron hollow fiber membrane resulting in a retentate that contained higher levels of BCAA than the permeate. The retentate also contained higher levels of essential amino acids (EAA) than the permeate, at 31% as compared to 27% in the permeate (Table 1).

TABLE 1

Amino acid composition of the broth composition

| Lab Number: | 8721 | | 8718 | | 8719 | | 8720 | |
|---|---|---|---|---|---|---|---|---|
| Units | W/W % | | W/W % | | W/W % | | W/W % | |
| IDF ID | 3823HG | | 3216CBPC | | 3216CBPCR | | 3216CBPCP | |
| 160518 | Chicken Broth First Cook from Raw Chicken | Calculated to 100% Solids | Chicken Broth Second Cook 6 h @ 15 psig | Calculated to 100% Solids | Chicken Broth Second Cook Retentate | Calculated to 100% Solids | Chicken Broth Second Cook Permeate | Calculated to 100% Solids |
| Taurine | 0.60 | 1.65 | 0.09 | 0.42 | 0.08 | 0.35 | 0.08 | 0.62 |
| Hydroxyproline | 1.01 | 2.78 | 0.99 | 4.65 | 1.03 | 4.52 | 0.58 | 4.49 |
| Aspartic Acid | 1.27 | 3.50 | 1.64 | 7.71 | 1.78 | 7.81 | 0.97 | 7.50 |
| Threonine | 0.49 | 1.35 | 0.64 | 3.01 | 0.70 | 3.07 | 0.36 | 2.78 |
| Serine | 0.55 | 1.52 | 0.62 | 2.91 | 0.65 | 2.85 | 0.34 | 2.63 |
| Glutamic Acid | 3.34 | 9.20 | 3.12 | 14.66 | 3.43 | 15.04 | 1.70 | 13.15 |
| Proline | 1.20 | 3.31 | 1.33 | 6.25 | 1.37 | 6.01 | 0.77 | 5.96 |
| Lanthionine | 0.01 | 0.03 | 0.03 | 0.14 | 0.03 | 0.13 | 0.01 | 0.08 |
| Glycine | 2.45 | 6.75 | 2.29 | 10.76 | 2.46 | 10.79 | 1.35 | 10.44 |
| Alanine | 1.42 | 3.91 | 1.42 | 6.67 | 1.55 | 6.80 | 0.81 | 6.26 |
| Cysteine | 0.13 | 0.36 | 0.07 | 0.33 | 0.08 | 0.35 | 0.04 | 0.31 |
| Valine | 0.49 | 1.35 | 0.63 | 2.96 | 0.68 | 2.98 | 0.35 | 2.71 |
| Methionine | 0.27 | 0.74 | 0.37 | 1.74 | 0.41 | 1.80 | 0.20 | 1.55 |
| Isoleucine | 0.43 | 1.18 | 0.58 | 2.73 | 0.65 | 2.85 | 0.31 | 2.40 |
| Leucine | 0.90 | 2.48 | 1.20 | 5.64 | 1.35 | 5.92 | 0.63 | 4.87 |
| Tyrosine | 1.42 | 3.91 | 0.47 | 2.21 | 0.51 | 2.24 | 0.32 | 2.47 |
| Phenylalanine | 0.38 | 1.05 | 0.52 | 2.44 | 0.59 | 2.59 | 0.30 | 2.32 |
| Hydroxylysine | 0.13 | 0.36 | 0.14 | 0.66 | 0.16 | 0.70 | 0.09 | 0.70 |
| Ornithine | 0.06 | 0.17 | 0.01 | 0.05 | 0.02 | 0.09 | 0.01 | 0.08 |
| Lysine | 1.26 | 3.47 | 1.39 | 6.53 | 1.55 | 6.80 | 0.74 | 5.72 |
| Histidine | 0.71 | 1.96 | 0.41 | 1.93 | 0.44 | 1.93 | 0.25 | 1.93 |
| Arginine | 0.92 | 2.54 | 1.29 | 6.06 | 1.42 | 6.23 | 0.66 | 5.10 |
| Tryptophan | 0.06 | 0.17 | 0.10 | 0.47 | 0.11 | 0.48 | 0.05 | 0.39 |
| Total Amino Acids | 19.50 | 53.73 | 19.35 | 90.93 | 21.05 | 92.32 | 10.92 | 84.45 |

TABLE 1-continued

| Amino acid composition of the broth composition | | | | | | | | |
|---|---|---|---|---|---|---|---|---|
| Branched Chain AA | 1.82 | 5.02 | 2.41 | 11.33 | 2.68 | 11.75 | 1.29 | 9.98 |
| Crude Protein | 26.54 | 73.13 | 20.99 | 98.64 | 22.26 | 97.63 | 12.66 | 97.91 |
| Moisture | 63.71 | 0.00 | 78.72 | 0.00 | 77.20 | 0.00 | 87.07 | 0.00 |
| Crude Fat | 4.29 | 11.82 | 0.46 | 2.16 | 0.43 | 1.89 | 0.25 | 1.93 |
| Crude Fiber | nd | | nd | nd | nd | nd | nd | nd |
| Ash | 5.22 | 14.38 | 1.07 | 5.03 | 0.95 | 4.17 | 0.92 | 7.12 |

As shown in Table 1, without being subject to filtration, the second cook broth contained significantly higher amount of BCAA than first cook broth. The level of BCAA in the first cook broth ranged from 4.6% to 5.1%, while second cook broth samples from the same material stream ranged from 9 to 12%, both calculated based on 100% solid basis.

Sodium levels were also monitored. Sodium levels in the second cook broth were lower than first cook broth. First cook broth samples (on a solids basis) historically range from 1.9% to 2.2% (w/w) sodium, while second cook broth samples ranged from 0.56 to 0.65% (w/w).

Example 2 Preparation of Bone Broth with Reduced Sodium

Raw chicken bones are cooked in a large system in a plant at a minimum of 102° C. for a minimum of 30 minutes. Broth liquid is separated from the insoluble fraction and the fat. A sample of the first cook broth is analyzed for sodium. The cooked bones are added to two parts water and cooked a second time using the same temperature and time, and the resulting broth is again analyzed for sodium, which is lower than the sodium level of the first cook.

Example 3 Preparation of a Broth Composition with Reduced Sodium by Filtration Concentrated frozen chicken bone broth (a first cook broth made from ground raw chicken bones) was reconstituted to around 13% solids and passed through a 50 nanometer ceramic membrane. On a solids basis, the feed broth had 2.33% sodium. The Permeate had 3.3% sodium compared to 1.68% sodium in retentate. The retentate from membrane separation had only 72% of the sodium in the feed sample, showing that membrane separation also can be used to make a reduced sodium broth without a second cook.

Example 4 Preparation of a Broth Composition with Lighter Color by Filtration Bone broth concentrate from plant was diluted and heated to a temperature of 145 F. The heated broth was pumped through a 0.2 micron hollow fiber membrane. The first permeate was collected. It was clear but had a medium brown color, with roasted notes. This permeate was pumped through a 3 kilo-dalton (KD) hollow fiber membrane. The second permeate was collected. The second permeate from the 3 KD membrane was light yellow, much lighter than the first permeate.

Example 5 Filtration of Broth Prepared From Poultry and Beef

Mechanically Separated Chicken (MSC) from a poultry plant and Ground Beef from the supermarket were separately processed using the process of this disclosure to produce cooked soluble protein liquids. Each raw meat material was mixed with two parts of carbonated water, and two protease enzymes were mixed well into each batch. A fungal protease was added at 0.7 percent of solids, and papain was added at 0.01% of solids. The temperature was increased to 122° F. (50° C.) and the mixture was incubated for 2 hours. Then, the temperature was increased to 176° F. (80° C.) and the batch was incubated for one additional hour. The enzymes were deactivated by heating the batch to boiling for 15 minutes. The product was passed through a fine screen to remove undissolved solids from the liquid fraction, and the liquid fraction was separated into broth and fat fractions.

The broth fraction was then pumped through a 0.2 micrometer hollow fiber membrane and the permeate collected. The permeate was then passed through a 100 kilo-Dalton hollow fiber membrane and this permeate was collected and reduced to over 60% solids on stove top. The soluble liquid concentrates from the chicken and beef were each analyzed for crude protein, fat, ash, and amino acid profile (Table 2). These soluble protein concentrates were then formulated into standard rat diets for a feeding study for protein efficiency ratio.

TABLE 2

| Amino Acid Profiles of Soluble Chicken and Beef Protein compositions | | | | | | |
|---|---|---|---|---|---|---|
| ESCL # Units | | Soluble Chicken Protein 13719 W/W % | | | Soluble Beef Protein 13717 W/W % | |
| IDF ID | SCP Liquid Conc. | Calculated to 100% Solids: | Calculated to % of Total AA | SBP Liquid Conc. | Calculated to 100% Solids: | Calculated to % of Total AA |
| Taurine | 0.32 | 0.52 | 0.63 | 0.18 | 0.31 | 0.38 |
| Hydroxyproline | 0.79 | 1.29 | 1.56 | 1.00 | 1.73 | 2.09 |
| Aspartic Acid | 4.37 | 7.15 | 8.61 | 4.08 | 7.06 | 8.54 |
| Threonine | 2.08 | 3.40 | 4.10 | 1.81 | 3.13 | 3.79 |
| Serine | 1.69 | 2.77 | 3.33 | 1.60 | 2.77 | 3.35 |
| Glutamic Acid | 7.95 | 13.01 | 15.67 | 7.39 | 12.79 | 15.46 |
| Proline | 2.62 | 4.29 | 5.16 | 2.65 | 4.59 | 5.55 |

TABLE 2-continued

Amino Acid Profiles of Soluble Chicken and Beef Protein compositions

| ESCL #<br>Units<br>IDF ID | Soluble Chicken Protein<br>13719<br>W/W % | | | Soluble Beef Protein<br>13717<br>W/W % | | |
|---|---|---|---|---|---|---|
| | SCP<br>Liquid Conc. | Calculated<br>to 100%<br>Solids: | Calculated<br>to % of<br>Total AA | SBP<br>Liquid Conc. | Calculated<br>to 100%<br>Solids: | Calculated<br>to % of<br>Total AA |
| Lanthionine | 0.00 | 0.00 | 0.00 | 0.00 | 0.00 | 0.00 |
| Glycine | 3.34 | 5.46 | 6.58 | 3.63 | 6.28 | 7.60 |
| Alanine | 3.34 | 5.46 | 6.58 | 3.19 | 5.52 | 6.68 |
| Cysteine | 0.35 | 0.57 | 0.69 | 0.30 | 0.52 | 0.63 |
| Valine | 2.62 | 4.29 | 5.16 | 2.33 | 4.03 | 4.88 |
| Methionine | 1.19 | 1.95 | 2.35 | 0.94 | 1.63 | 1.97 |
| Isoleucine | 2.22 | 3.63 | 4.38 | 1.82 | 3.15 | 3.81 |
| Leucine | 3.96 | 6.48 | 7.81 | 3.52 | 6.09 | 7.37 |
| Tyrosine | 2.10 | 3.44 | 4.14 | 1.73 | 3.00 | 3.62 |
| Phenylalanine | 1.89 | 3.09 | 3.73 | 1.62 | 2.80 | 3.39 |
| Hydroxylysine | 0.13 | 0.21 | 0.26 | 0.13 | 0.23 | 0.27 |
| Ornithine | 0.15 | 0.25 | 0.30 | 0.04 | 0.07 | 0.08 |
| Lysine | 4.32 | 7.07 | 8.52 | 4.38 | 7.58 | 9.17 |
| Histidine | 1.47 | 2.41 | 2.90 | 1.83 | 3.17 | 3.83 |
| Arginine | 3.30 | 5.40 | 6.51 | 3.19 | 5.52 | 6.68 |
| Tryptophan | 0.53 | 0.87 | 1.04 | 0.43 | 0.74 | 0.90 |
| Total Amino Acids | 50.73 | 83.00 | 100 | 47.79 | 82.74 | 100 |
| Crude Protein* | 55.45 | | | 52.19 | | |
| Moisture | 38.88 | | | 42.24 | | |
| Crude Fat | 3.28 | | | 3.97 | | |
| Crude Fiber | n.d. | | | n.d. | | |
| Ash | 3.69 | | | 3.11 | | |
| Pepsin Digestibility | 99.73 | | | 99.40 | | |

Example 6 Membrane Separation Enriches Certain Component in the Retentate or Permeate Fresh chicken bone broth was obtained from a production plant. It had 8.8% solids content before passing through the membrane system.

The membrane used was a tangential hollow fiber membrane filter. The membrane fiber was a modified polyethersulfone with a pore size of 0.20 micron. The hollow fibers were 1 mm in diameter and 20 cm in length with a cross sectional area of 75 cm$^2$.

The membrane process produced a permeate liquid that was visually clear with a solids content of 1.6%, and a retentate stream with a solids content of 11.6% solids. The permeate comprised about 29% of the total product volume collected and the retentate fraction was 71%.

Samples of permeate, retentate and the original sample feeding into the membrane system were sent to an outside laboratory for amino acid analysis (Table 3). Both the analysis as reported are listed as well as these results standardized to an equal 100% solids basis, which is close to the solids content of spray dried powder products. The Permeate appeared to have significantly higher amount of Taurine than the amount of Taurine in the starting broth. The permeate may be higher in tyrosine and histidine than starting broth.

Retentate had higher levels of collagen related amino acids than the levels in the starting bone broth. The Retentate had about 5% higher in collagen protein (calculated by hydroxyproline×8). This process may be used when higher collagen protein in the diet is desirable.

Permeate had significantly lower levels of amino acids related to collagen proteins. This observation is of value in certain market segments like sports nutrition, specifically body building, where collagen proteins are often avoided.

Specific nutrients of value were concentrated by the methodology of this disclosure. It can also be seen in this example that some nutrients may be concentrated in the retentate (fraction that does not pass through the membrane) or reduced while other compounds are concentrated/reduced in the permeate (fraction that passes through the membrane.). The disclosed product streams have increased value to consumers through the partitioning, reduction, or concentration of individual nutrition compounds into the separated fractions.

TABLE 3

| | Description: Chicken Broth | | | | | |
|---|---|---|---|---|---|---|
| ESCL #<br>Units<br>Customer ID | 6261<br>W/W %<br>Bone Broth | | 6262<br>W/W %<br>Permeate | | 6263<br>W/W %<br>Retentate | |
| | 8.8% Solids: | 100% Solids: | 1.6% Solids: | 100% Solids: | 11.6% Solids: | 100% Solids: |
| Taurine | 0.03 | 0.34 | 0.03 | 1.88 | 0.03 | 0.26 |
| Hydroxproline | 0.75 | 8.52 | 0.09 | 5.63 | 1.07 | 9.22 |
| Aspartic Acid | 0.50 | 5.68 | 0.09 | 5.63 | 0.68 | 5.86 |
| Threonine | 0.19 | 2.16 | 0.02 | 1.25 | 0.26 | 2.24 |

TABLE 3-continued

| | Description: Chicken Broth | | | | | |
|---|---|---|---|---|---|---|
| ESCL # Units Customer ID | 6261 W/W % Bone Broth 8.8% Solids: | 100% Solids: | 6262 W/W % Permeate 1.6% Solids: | 100% Solids: | 6263 W/W % Retentate 11.6% Solids: | 100% Solids: |
| Serine | 0.19 | 2.16 | 0.03 | 1.88 | 0.26 | 2.24 |
| Glutamic Acid | 0.93 | 10.57 | 0.14 | 8.75 | 1.27 | 10.95 |
| Proline | 0.85 | 9.66 | 0.11 | 6.88 | 1.18 | 10.17 |
| Lanthionine | 0.00 | 0.00 | 0.00 | 0.00 | 0.00 | 0.00 |
| Glycine | 1.58 | 17.95 | 0.19 | 11.88 | 2.20 | 18.97 |
| Alanine | 0.70 | 7.95 | 0.08 | 5.00 | 0.98 | 8.45 |
| Cysteine | 0.00 | 0.00 | 0.00 | 0.00 | 0.01 | 0.09 |
| Valine | 0.20 | 2.27 | 0.02 | 1.25 | 0.28 | 2.41 |
| Methionine | 0.10 | 1.14 | 0.01 | 0.63 | 0.14 | 1.21 |
| Isoleucine | 0.15 | 1.70 | 0.03 | 1.88 | 0.21 | 1.81 |
| Leucine | 0.30 | 3.41 | 0.04 | 2.50 | 0.42 | 3.62 |
| Tyrosine | 0.12 | 1.36 | 0.05 | 3.13 | 0.14 | 1.21 |
| Phenylalanine | 0.20 | 2.27 | 0.03 | 1.88 | 0.28 | 2.41 |
| Hydroxylysine | 0.10 | 1.14 | 0.02 | 1.25 | 0.14 | 1.21 |
| Ornithine | 0.00 | 0.00 | 0.00 | 0.00 | 0.01 | 0.09 |
| Lysine | 0.32 | 3.64 | 0.03 | 1.88 | 0.45 | 3.88 |
| Histidine | 0.09 | 1.02 | 0.03 | 1.88 | 0.12 | 1.03 |
| Arginine | 0.60 | 6.82 | 0.06 | 3.75 | 0.84 | 7.24 |
| Tryptophan | 0.02 | 0.23 | <0.02 | | 0.03 | 0.26 |

Example 7

Fresh mechanically separated chicken (MSC) was obtained from a production plant and mixed with equal weight of water. Two protease enzymes (Enzyme Development Corporation Enzymes Alkaline and FNP) were mixed in well at 0.07% of the MSC weight. The mixture was incubated for 2 hours at 140° F. Then, the mixture was cooked in a pressure cooker at 15 psig for two hours. This step completely deactivated the enzymes as well as extracting a generous amount of soluble chicken protein broth. The soluble protein fraction was separated from the fat and insoluble fractions by centrifugation and screening. The resultant liquid protein was frozen and stored, then thawed for this test.

The broth was diluted to a solids content of 12.6%, and passed through a membrane. The membrane used was a tangential hollow fiber membrane filter. The membrane fiber was a modified polyethersulfone (mPES) with a pore size of 0.20 micron. The hollow fibers were 1 mm in diameter and 20 cm in length with a cross sectional area of 75 cm².

The membrane process produced a permeate liquid that was visually clear with a solids content of 11.3%, and a retentate stream with a solids content of 13.6% solids. The permeate comprised 56% of the total volume and retentate 44% by volume.

Samples of permeate, retentate and the original sample feeding into the membrane system were sent to an outside laboratory for amino acid analysis (Table 4). The analysis as reported is listed along with these results standardized to an equal 100% solids basis, which is close to the solids content of spray dried powder products.

It can be seen that the ash content is higher in the permeate. This is an indication that a higher percentage of dissolved minerals is passing through the membrane into this fraction. Minerals in an easily assimilated soluble state provide an added health value to the product.

TABLE 4

| | Chicken Broth Fractions From Membrane Separation Process | | | | | |
|---|---|---|---|---|---|---|
| Lab No: Units | 7486 W/W % | | 7487 W/W % | | 7488 W/W % | |
| Sample ID | 38.9HN Feed Broth | Calculated to 100% Solids | 13.6HNR Retentate | Calculated to 100% Solids | 11.3HNP Permeate | Calculated to 100% Solids |
| Taurine | 0.15 | 0.39 | 0.05 | 0.49 | 0.05 | 0.42 |
| Hydroxyproline | 0.57 | 1.47 | 0.21 | 2.07 | 0.13 | 1.10 |
| Aspartic Acid | 2.92 | 7.51 | 1.05 | 10.34 | 0.88 | 7.46 |
| Threonine | 1.33 | 3.42 | 0.48 | 4.73 | 0.40 | 3.39 |
| Serine | 1.06 | 2.73 | 0.38 | 3.74 | 0.32 | 2.71 |
| Glutamic Acid | 5.18 | 13.32 | 1.89 | 18.62 | 1.59 | 13.49 |
| Proline | 1.48 | 3.81 | 0.56 | 5.52 | 0.42 | 3.56 |
| Lanthionine | 0.05 | 0.13 | 0.01 | 0.10 | 0.01 | 0.08 |
| Glycine | 2.17 | 5.58 | 0.84 | 8.28 | 0.62 | 5.26 |
| Alanine | 2.14 | 5.50 | 0.78 | 7.68 | 0.65 | 5.51 |
| Cysteine | 0.19 | 0.49 | 0.07 | 0.69 | 0.05 | 0.42 |
| Valine | 1.57 | 4.04 | 0.56 | 5.52 | 0.48 | 4.07 |
| Methionine | 0.79 | 2.03 | 0.28 | 2.76 | 0.23 | 1.95 |
| Isoleucine | 1.45 | 3.73 | 0.51 | 5.02 | 0.44 | 3.73 |
| Leucine | 2.49 | 6.40 | 0.88 | 8.67 | 0.77 | 6.53 |
| Tyrosine | 1.34 | 3.45 | 0.41 | 4.04 | 0.37 | 3.14 |

TABLE 4-continued

Chicken Broth Fractions From Membrane Separation Process

| Lab No: | 7486 | | 7487 | | 7488 | |
|---|---|---|---|---|---|---|
| Units | W/W % | | W/W % | | W/W % | |
| Sample ID | 38.9HN Feed Broth | Calculated to 100% Solids | 13.6HNR Retentate | Calculated to 100% Solids | 11.3HNP Permeate | Calculated to 100% Solids |
| Phenylalanine | 1.16 | 2.98 | 0.39 | 3.84 | 0.34 | 2.88 |
| Hydroxylysine | 0.10 | 0.26 | 0.03 | 0.30 | 0.02 | 0.17 |
| Ornithine | 0.28 | 0.72 | 0.10 | 0.99 | 0.09 | 0.76 |
| Lysine | 2.86 | 7.35 | 1.04 | 10.25 | 0.86 | 7.29 |
| Histidine | 0.95 | 2.44 | 0.35 | 3.45 | 0.30 | 2.54 |
| Arginine | 1.84 | 4.73 | 0.70 | 6.90 | 0.54 | 4.58 |
| Tryptophan | 0.34 | 0.87 | 0.11 | 1.08 | 0.09 | 0.76 |
| Total Amino Acids | 32.41 | 83.34 | 11.68 | 115.07 | 9.65 | 81.85 |
| Crude Protein | 34.90 | 89.74 | 12.64 | 124.53 | 10.46 | 88.72 |
| Moisture | 61.11 | 0.00 | 89.85 | 0.00 | 88.21 | 0.00 |
| Crude Fat | 2.37 | 6.09 | 0.53 | 5.22 | 0.26 | 2.21 |
| Crude Fiber | 0.00 | 0.00 | 0.00 | 0.00 | 0.00 | 0.00 |
| Ash | 2.00 | 5.14 | 0.70 | 6.90 | 0.65 | 5.51 |
| EAA for IOM total | | 33.27 | | 45.32 | | 33.16 |
| BCAA Total | | 14.17 | | 19.21 | | 14.33 |
| % collagen protein | | 11.73 | | 16.55 | | 8.82 |

Example 8

An in-process chicken broth with 3.4% solids content was collected from plant operations. This broth is typically cloudy containing some amount of emulsified lipids and phospholipids, and was found to contain 15.7 mg/100 grams total choline or 641.8 mg/100 g total choline calculated to a solids basis. After passing this broth through the membrane column of example one, 70% permeate and 30% retentate by volume was obtained. The retentate with 9.1% solids contained 50.1 mg/100 grams total choline. This calculated to 550.5 mg/100 g on a solids basis. The permeate with 2.3% solids contained <1 mg/100 grams total choline and was crystal clear with no cloudy, fatty emulsion.

This results shows that virtually no lipid based materials with choline passed through the membrane, effectively removing a specific compound from the permeate product and showing the utility of the membrane system for the purpose of removing compounds by fractionation based on molecular size.

On the other hand, a retentate product was saved with a valuable nutrition compound to be processed further, added to another product to boost nutritive value, or sold for its own merit.

In addition to the data on choline above, total and free amino acid analyses were done on the same samples with the following results (Table 5) for the data which has been calculated to 100% solids for comparability.

The results show that on a solids basis, total amino acids of permeate increased while retentate amino acid content decreased. The same was true of branched chain amino acids. Also, the amount of valued essential amino acids and taurine increased dramatically in the permeate while decreasing in the retentate.

It is noteworthy that hydroxyproline, used to calculate collagen protein content, is lower in the permeate sample, indicating a reduction of collagen protein in this fraction.

From the physiological free amino acid assay, it was observed that total anserine and carnosine concentration increased dramatically in the permeate while decreasing in the retentate.

The permeate fraction was notably higher in glutamic acid, glutamine, and taurine.

These results further support the utility of the membrane system for adding nutritional value to a product stream.

TABLE 5

Chicken Broth for Membrane Fractionation Test
TOTAL Amino Acid Report—100% Solids Basis

| Lab No: | 7945 | 7946 | 7947 |
|---|---|---|---|
| Units | W/W % | W/W % | W/W % |
| Sample ID | 3.4 CB | 2.3 CBP | 9.1 CBR |
| | Feed | Permeate | Retentate |
| Taurine | 0.88 | 3.04 | 0.22 |
| Hydroxyproline | 1.68 | 1.04 | 1.92 |
| Aspartic Acid | 2.35 | 3.04 | 2.09 |
| Threonine | 0.88 | 1.30 | 0.77 |
| Serine | 0.88 | 1.30 | 0.66 |
| Glutamic Acid | 4.71 | 8.26 | 3.41 |
| Proline | 2.12 | 2.30 | 1.88 |
| Lanthionine | 0.00 | 0.00 | 0.00 |
| Glycine | 4.12 | 5.22 | 3.52 |
| Alanine | 2.06 | 2.61 | 1.76 |
| Cysteine | 0.29 | 0.00 | 0.11 |
| Valine | 1.18 | 1.74 | 0.77 |
| Methionine | 0.88 | 0.43 | 0.55 |
| Isoleucine | 1.47 | 1.74 | 0.88 |
| Leucine | 1.47 | 2.17 | 1.21 |
| Tyrosine | 1.76 | 5.65 | 0.88 |
| Phenylalanine | 0.88 | 1.30 | 0.77 |
| Hydroxylysine | 0.29 | 0.00 | 0.44 |
| Ornithine | 0.00 | 0.43 | 0.00 |
| Lysine | 1.76 | 2.61 | 1.54 |
| Histidine | 0.88 | 3.48 | 0.55 |
| Arginine | 1.76 | 1.30 | 1.43 |
| Tryptophan | 0.59 | 0.87 | 0.22 |
| Total | 32.91 | 49.87 | 25.56 |
| Crude Protein | 40.29 | 86.96 | 35.38 |
| Moisture | | | |
| Crude Fat | 65.00 | 18.26 | 76.59 |
| Crude Fiber | | | |
| Ash | 6.47 | 24.35 | 3.41 |
| BCAA Total | 4.1 | 5.7 | 2.9 |
| EAA Total | 12.1 | 21.3 | 8.2 |

TABLE 5-continued

Chicken Broth for Membrane Fractionation Test
TOTAL Amino Acid Report—100% Solids Basis

| | | | |
|---|---|---|---|
| Collagen Protein | 13.4 | 8.3 | 15.4 |
| Phosphoserine | 0.000 | 0.000 | 0.110 |
| Taurine | 0.882 | 3.043 | 0.330 |
| Phosphoethanolamine | 0.000 | 0.000 | 0.000 |
| Urea | 0.588 | 2.174 | 0.220 |
| Aspartic Acid | 0.294 | 0.870 | 0.110 |
| Hydroxyproline | 0.000 | 0.000 | 0.000 |
| Threonine | 0.000 | 0.435 | 0.000 |
| Serine | 0.294 | 0.870 | 0.110 |
| Asparagine | 0.000 | 0.000 | 0.000 |
| Glutamic Acid | 0.294 | 1.739 | 0.110 |
| Glutamine | 0.000 | 0.435 | 0.000 |
| Sarcosine | 0.000 | 0.000 | 0.000 |
| α-amino-adipic acid | 0.000 | 0.000 | 0.000 |
| Proline | 0.000 | 0.435 | 0.000 |
| Glycine | 0.294 | 0.870 | 0.110 |
| Alanine | 0.294 | 1.304 | 0.110 |
| Citruline | 0.000 | 0.000 | 0.000 |
| α-amino-n-butyric acid | 0.000 | 0.000 | 0.000 |
| Valine | 0.000 | 0.435 | 0.000 |
| Methionine | 0.000 | 0.000 | 0.000 |
| Cystine | 0.294 | 0.435 | 0.220 |
| Isoleucine | 0.000 | 0.000 | 0.000 |
| Leucine | 0.000 | 0.435 | 0.000 |
| Tyrosine | 0.000 | 0.000 | 0.000 |
| Cystathionine/allocystathine | 0.000 | 0.000 | 0.000 |
| Phenylalanine | 0.000 | 0.435 | 0.000 |
| β-alanine | 0.000 | 0.000 | 0.000 |
| β-amino-isobutyric acid | 0.000 | 0.000 | 0.000 |
| γ-amino-butyric acid | 0.000 | 0.000 | 0.000 |
| Homocystine | 0.000 | 0.000 | 0.000 |
| Ethanolamine | 0.000 | 0.000 | 0.000 |
| Tryptophan | 0.294 | 0.435 | 0.110 |
| Hydroxylysine | 0.000 | 0.000 | 0.000 |
| Ornithine | 0.000 | 0.000 | 0.000 |
| Lysine | 0.294 | 0.870 | 0.110 |
| 1-methyl-histidine | 0.000 | 0.000 | 0.000 |
| Histidine | 0.000 | 0.435 | 0.000 |
| 3-methyl-histine | 0.000 | 0.000 | 0.000 |
| Anserine | 2.059 | 8.261 | 0.769 |
| Carnosine | 0.882 | 3.478 | 0.330 |
| Arginine | 0.000 | 0.435 | 0.110 |

Sample Notes:
Sample 3.4CB is Liquid Chicken Protein feeding the membrane.
Sample 2.3CBP is the permeate from the membrane.
Sample 9.3CBR is the retentate from the membrane.

REFERENCES

All references listed below as well as publications, patents, patent applications cited throughout this disclosure are hereby incorporated expressly into this disclosure as if fully reproduced herein.
Shah et al., U.S. patent application Ser. No. 10/912,560.
Shah et al., U.S. patent application Ser. No. 10/919,518.
Shah et al., U.S. patent application Ser. No. 10/932,295.
Shah et al., U.S. patent application Ser. No. 10/972,089.
Shah et al., U.S. patent application Ser. No. 11/153,435.
Dake et al., U.S. patent application Ser. No. 14/210,284.
Dake et al., U.S. patent application Ser. No. 14/698,150.
Dake et al., U.S. patent application Ser. No. 14/698,274.
Dake et al., U.S. patent application Ser. No. 14/698,332.
Dake et al., U.S. patent application Ser. No. 14/850,405.
USDA SR-21 released Dec. 7, 2011 by U.S. Department of Agriculture.

We claim:

1. A method of making a composition, comprising:
(a) applying a starting material to a filtration means, wherein said filtration means has a pore size of 100 nanometers (nm) or smaller and specifically retains branched chain amino acids (BCAA),
(b) allowing the starting material to pass through the filtration means to generate a retentate and a permeate, and
(c) collecting the retentate to obtain said composition, wherein the starting material is a broth composition prepared from an animal or plant source, and wherein branched chain amino acids (BCAA) constitute more than 6% (w/w) of total amino acids in the composition obtained in step (c), and the amount of branched chain amino acids (BCAA) in the composition obtained in step (c) is at least 20% higher than the amount of BCAA in the starting material.

2. The method of claim 1, wherein the amount of branched chain amino acids (BCAA) in the composition obtained in step (c) is at least 30% higher than the amount of BCAA in the starting material.

3. The method of claim 1, wherein BCAA constitute more than 10% (w/w) of total amino acids in said composition obtained in step (c).

4. The method of claim 1, wherein the amount of essential amino acids (EAA) in the composition obtained in step (c) is at least 20% higher than the amount of EAA in the composition in the starting material.

5. The method of claim 1, wherein EAA constitute more than 33% (w/w) of total amino acids in said composition obtained in step (c).

6. The method of claim 1, wherein the level of sodium in the composition obtained in step (c) is at least 50% lower than the level of sodium in the starting material.

7. The method of claim 1, wherein sodium constitutes less than 1% (w/w) based on total solids in said composition obtained in step (c).

8. The method of claim 1, wherein said filtration means is selected from the group consisting of microfiltration, ultrafiltration, nanofiltration, reverse osmosis, and combination thereof.

9. The method of claim 1, wherein said starting material is prepared from animal parts in the presence of an added enzyme.

10. The method of claim 1, further comprising a step (d) of collecting the permeate to obtain a second composition, wherein the color of the second composition obtained in step (d) is different from the color of the starting material.

11. The method of claim 10, wherein the color of the second composition obtained in step (d) is substantially lighter than the color of the starting material.

12. A method for preparing a composition, comprising:
(a) incubating a first mixture at a temperature of 40° C. or higher for a time period of at least 5 minutes, said first mixture comprising a liquid fraction and a solid fraction,
wherein at least said solid fraction has been cooked prior to step (a),
(b) separating the liquid fraction from the solid fraction of the first mixture after step (a),
(c) collecting the liquid fraction of step (b),
(d) applying the liquid fraction collected in step (c) to a filtration means, and
(e) collecting the retentate to obtain said composition, wherein said filtration means has a pore size of 100 nanometers (nm) or smaller and specifically retains branched chain amino acids (BCAA), wherein the amount of branched chain amino acids (BCAA) in the composition obtained in step (e) is at least 20% higher than the amount of BCAA in the first mixture prior to step (a).

13. The method of claim 12, wherein the solid fraction of the first mixture has been refrigerated prior to step (a).

14. The method of claim 12, wherein the incubation of step (a) takes place under pressure between 1 psig to 20 psig.

15. The method of claim 12, wherein the incubation of step (a) takes place at a temperature between 50-125° C.

16. The method of claim 12, wherein the amount of branched chain amino acids (BCAA) in the composition obtained in step (c) is at least 20% higher than the amount of BCAA in the first mixture prior to step (a).

17. The method of claim 12, further comprising step (d) applying the liquid fraction collected in step (c) to a filtration means and step (e) collecting retentate or permeate, said filtration means having pore size of 100 nm or smaller.

18. A method for preparing a composition, comprising:
 (a) mixing animal parts with water or an aqueous solution to form a mixture,
 (b) incubating the mixture of step (a) at a temperature of 40° C. or higher for a time period of at least 5 minutes,
 (c) removing liquid fraction from solid fraction after step (b),
 (d) incubating the solid fraction obtained from step (c) with water or an aqueous solution at a temperature of between 50° C. and 120° C. for a time period of at least 5 minutes,
 (e) removing solid fraction from liquid fraction after step (d), and
 (f) collecting the liquid fraction from step (e) to obtain said composition.

19. The method of claim 18, further comprising a step (g) applying the liquid fraction collected in step (f) to a filtration means, and step (h) collecting retentate or permeate to obtain said composition, said filtration means having a pore size of 100 nanometers (nm) or smaller.

20. A composition prepared according to the method of claim 1.

* * * * *